United States Patent
Taheri et al.

(10) Patent No.: US 11,495,054 B2
(45) Date of Patent: Nov. 8, 2022

(54) MOTION-BASED HUMAN VIDEO DETECTION

(71) Applicant: ObjectVideo Labs, LLC, Tysons, VA (US)

(72) Inventors: Sima Taheri, McLean, VA (US); Gang Qian, McLean, VA (US); Sung Chun Lee, Tysons, VA (US); Sravanthi Bondugula, Vienna, VA (US); Allison Beach, Leesburg, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 206 days.

(21) Appl. No.: 17/069,441

(22) Filed: Oct. 13, 2020

(65) Prior Publication Data

US 2021/0117658 A1 Apr. 22, 2021

Related U.S. Application Data

(60) Provisional application No. 62/924,242, filed on Oct. 22, 2019.

(51) Int. Cl.
*G06K 9/00* (2022.01)
*G06V 40/20* (2022.01)
(Continued)

(52) U.S. Cl.
CPC ............. *G06V 40/20* (2022.01); *G06N 3/084* (2013.01); *G06T 7/254* (2017.01); *G06V 10/98* (2022.01);
(Continued)

(58) Field of Classification Search
CPC ........ G06V 40/20; G06V 10/98; G06N 3/084; G06N 5/046; G06T 7/254;
(Continued)

(56) References Cited

U.S. PATENT DOCUMENTS 9,420,331 B2 8/2016 Laska et al.
9,477,901 B2 10/2016 Paiton et al.
(Continued)

OTHER PUBLICATIONS

Jin, Cheng-Bin, Shengzhe Li, and Hakil Kim. "Real-time action detection in video surveillance using sub-action descriptor with multi-cnn." arXiv preprint arXiv:1710.03383 (2017). (Year: 2017).*

(Continued)

*Primary Examiner* — Jonathan S Lee
(74) *Attorney, Agent, or Firm* — Fish & Richardson P.C.

(57) ABSTRACT

Methods, systems, and apparatus for motion-based human video detection are disclosed. A method includes generating a representation of a difference between two frames of a video; providing, to an object detector, a particular frame of the two frames and the representation of the difference between two frames of the video; receiving an indication that the object detector detected an object in the particular frame; determining that detection of the object in the particular frame was a false positive detection; determining an amount of motion energy where the object was detected in the particular frame; and training the object detector based on penalization of the false positive detection in accordance with the amount of motion energy where the object was detected in the particular frame.

20 Claims, 6 Drawing Sheets

(51) Int. Cl.
*G06T 7/254* (2017.01)
*G06N 3/08* (2006.01)
*G06V 10/98* (2022.01)
*G06N 5/04* (2006.01)

(52) U.S. Cl.
CPC .... *G06N 5/046* (2013.01); *G06T 2207/10024* (2013.01); *G06T 2207/20081* (2013.01); *G06T 2207/20084* (2013.01); *G06T 2207/20224* (2013.01); *G06T 2207/30196* (2013.01)

(58) Field of Classification Search
CPC . G06T 2207/10024; G06T 2207/20081; G06T 2207/20084; G06T 2207/20224; G06T 2207/30196
USPC ......................................................... 382/181
See application file for complete search history.

(56) References Cited

U.S. PATENT DOCUMENTS 9,904,852 B2    2/2018   Divakaran et al.
10,657,382 B2   5/2020   Chaudhry et al.

OTHER PUBLICATIONS

De Rossi, Giacomo, et al. "Cognitive robotic architecture for semi-autonomous execution of manipulation tasks in a surgical environment." 2019 IEEE/RSJ International Conference on Intelligent Robots and Systems (IROS). IEEE, 2019. (Year: 2019).*
Ji, Shuiwang, et al. "3D convolutional neural networks for human action recognition." IEEE transactions on pattern analysis and machine intelligence 35.1 (2012): 221-231. (Year: 2012).*
Ren, Jun, et al. "Toward three-dimensional human action recognition using a convolutional neural network with correctness-vigilant regularizer." Journal of Electronic Imaging 27.4 (2018): 043040. (Year: 2018).*
Saur, Günter, and Wolfgang Krüger. "Short-term change detection for UAV video." Image and Signal Processing for Remote Sensing XVIII. vol. 8537. SPIE, 2012. (Year: 2012).*
Roberto e Souza, Marcos, and Helio Pedrini. "Motion energy image for evaluation of video stabilization." The Visual Computer 35.12 (2019): 1769-1781. (Year: 2019).*

* cited by examiner

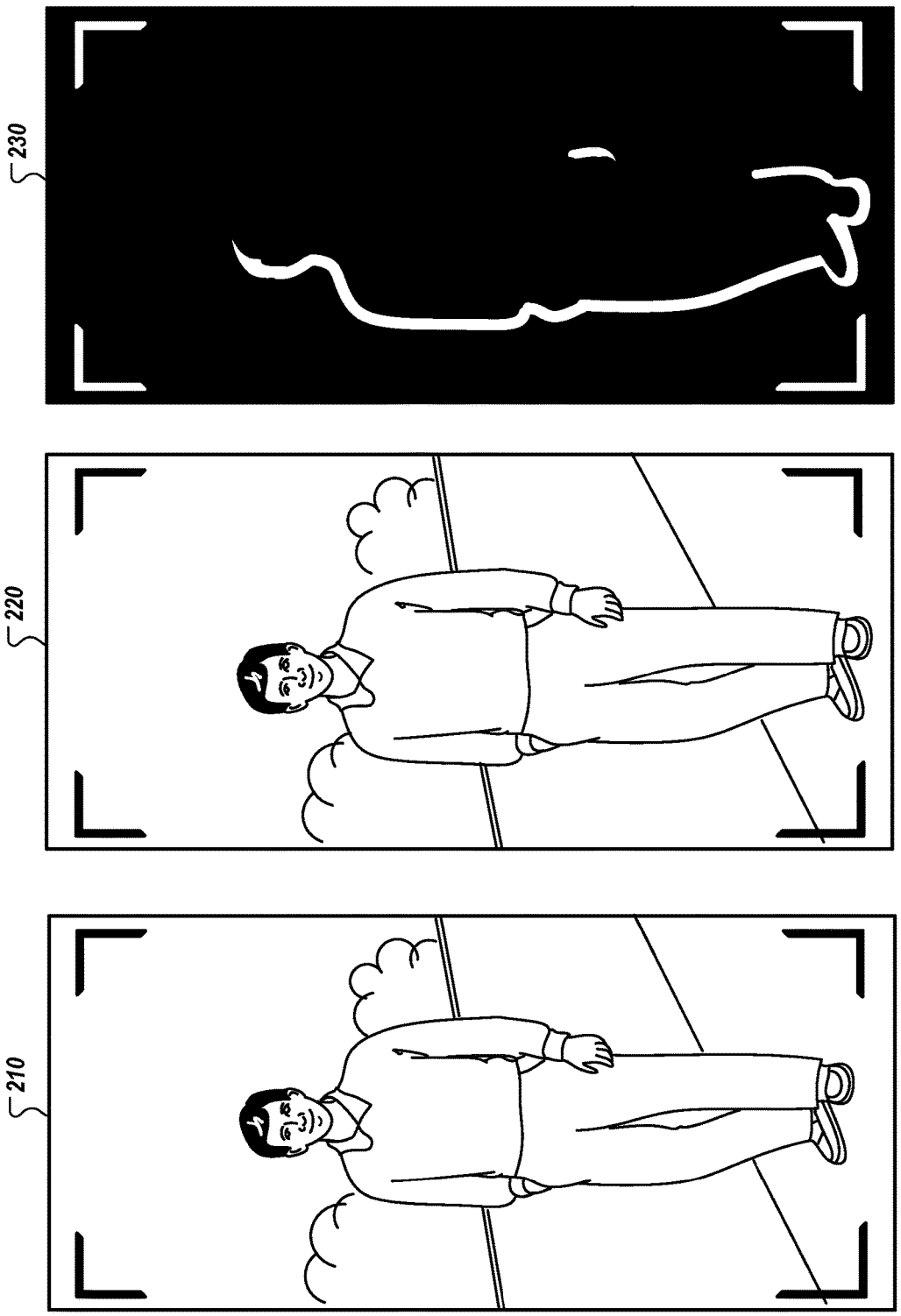

MOTION-BASED HUMAN VIDEO DETECTION

CROSS-REFERENCE TO RELATED APPLICATIONS

This application claims the benefit of the U.S. Provisional Patent Application No. 62/924,242 filed Oct. 22, 2019, which is incorporated herein by reference in its entirety.

TECHNICAL FIELD

This disclosure application relates generally to surveillance cameras.

BACKGROUND

Many properties are equipped with monitoring systems that include sensors and connected system components. Some residential-based monitoring systems include cameras.

SUMMARY

Techniques are described for motion-based human video detection.

Many residents and homeowners equip their properties with monitoring systems to enhance the security, safety, or convenience of their properties. A property monitoring system can include cameras that can obtain visual images of scenes at the property. In some examples, a camera can be incorporated into a component of the property monitoring system, such as a doorbell. In some examples, a camera may be a separate device, e.g., a surveillance camera located inside or outside the property.

A camera, e.g., a doorbell camera, can detect objects and track object movement within a field of view. For example, a doorbell camera with a field of view that includes a front yard of a property can track positions and movements of objects of interest in the front yard. Objects of interest can include, for example, humans, vehicles, and animals. The objects of interest may be moving or stationary. The doorbell camera can use video tracking to associate objects of interest in consecutive video images, or frames.

In some examples, objects of interest detected by a doorbell camera can trigger a property monitoring system to perform one or more actions. For example, detections of humans that meet pre-programmed criteria may trigger the property monitoring system to send a notification to a resident of the property or to adjust a setting of the property monitoring system. Example criteria can include a position of a human within a certain range of the property, a threshold number of humans approaching the property, and/or a human approaching the property late at night.

Doorbell cameras can provide notifications to residents when humans, e.g., visitors, approach a property. It is desirable for a doorbell camera to accurately detect humans and send valid notifications to the residents. Incorporating data from a motion detector can improve detection accuracy, however, motion detectors can be distracted by other sources of motion such as cars, animals, flags, and tree branches. Video analytics using deep learning algorithms to differentiate human motion from background object motion can improve human detection accuracy.

An object classifier within a doorbell camera can detect the presence of a human in three-channel red-green-blue (RGB) images. Deep learning-based human detection can improve detection accuracy in RGB images. Incorporating human motion information into a deep learning model can further improve human detection.

To fuse human motion information with an RGB image, a doorbell camera can compute a frame difference image between a current frame of a video and a previous frame of the video, or between a current frame of the video and a subsequent frame. The doorbell camera can convert the frame difference image to a single-channel grayscale image. In some examples, the doorbell camera may use the luma component, or "Y" channel, of the frame difference image to convert the frame difference image to grayscale. The doorbell camera can then add the grayscale frame difference image to the original RGB image as a fourth channel, where the first three channels are the red, green, and blue channels.

The four-channel image can be used for inference of objects within the image by the object classifier. The four-channel image can also be used to train a deep learning human detection model. The human detection model can not only learn to identify features corresponding to the human body, but can also learn to correlate the presence of a human in a frame to motion information in the fourth channel of the image. Additionally, training with the four-channel image can reduce false detections that may be caused by stationary objects within the field of view such as railings, trees, and lawn decorations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 illustrates example image frames that can be used for detecting humans using motion information.

Like reference numbers and designations in the various drawings indicate like elements.

DETAILED DESCRIPTION

Figure 1A:
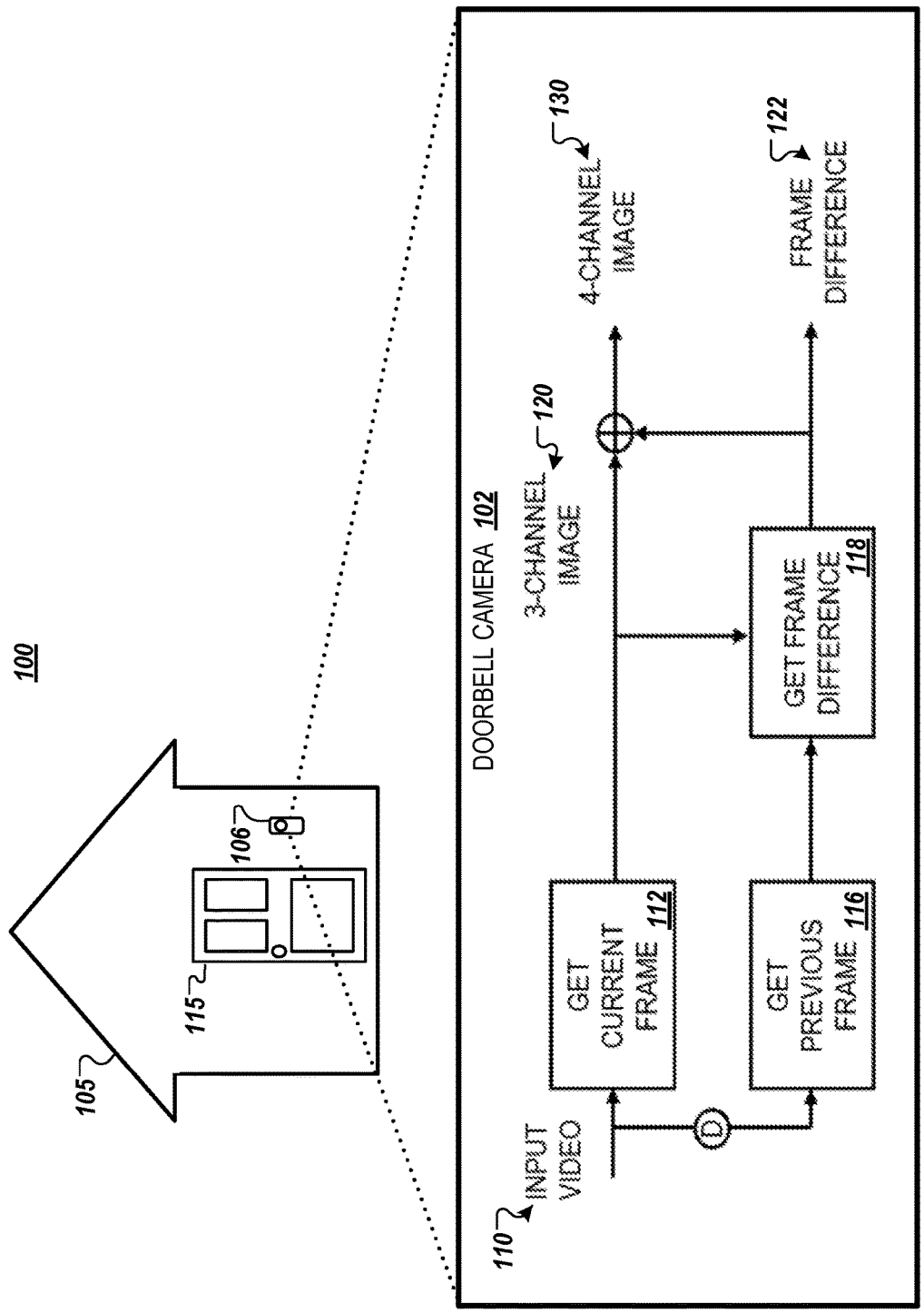
FIG. 1A illustrates an example system for training a motion-based human video detection using a doorbell camera.

FIG. 1A illustrates an example system 100 for training a motion-based human video detector using a doorbell camera. In FIG. 1A, a doorbell camera 102 is installed at a property 105. The property 105 can be a home, another residence, a place of business, a public space, or another facility that has one or more doorbell cameras 102, or other security cameras, installed. The doorbell camera 102 is a component of a doorbell 106 that is installed external to the property 105. The doorbell 106 is installed near a front door 115 of the property 105. In some examples, the doorbell 106 is a component of a home monitoring system that collects data from various sensors to monitor conditions and events at the property 105.

In addition to the doorbell camera 102, the doorbell 106 may include other components and sensors. For example, the doorbell 106 may include a button that, when depressed, causes an audible tone to sound at the property 105. The doorbell 106 may also include additional sensors, e.g., a motion sensor, temperature sensor, light sensor, and a microphone.

The doorbell camera 102 captures video from a scene within a field of view. The video includes multiple sequential images, or frames. The video can include any type of images. For example, the video can include visual light images, infrared images, or radio wave images. In some examples, the video can include a combination of one or more types of images, e.g., visual light images with infrared illumination. The field of view is an area that is observable by the doorbell camera 102. The doorbell camera 102 has a field of view that includes the area in front of the property 105. For example, the field of view can include a front yard, walkway, and street in front of the property 105.

In some examples, the doorbell camera 102 can capture video continuously. In some examples, the doorbell camera 102 can capture video when triggered by an event. For example, the doorbell camera 102 may capture video when triggered by depression of the button on the doorbell 106. In some examples, the doorbell camera 102 may capture video when triggered by activation of the motion sensor or other sensor of the doorbell 106.

The doorbell camera 102 may capture video for a preprogrammed amount of time. For example, when triggered by depression of the button on the doorbell 106, the doorbell camera 102 may capture video for a preprogrammed time of 10 seconds, 30 seconds, or 60 seconds. When triggered by a motion sensor, the doorbell camera 102 may capture video for a preprogrammed time and/or may capture video until the motion sensor no longer detects motion. The doorbell camera 102 can perform video analysis on captured video. Video analysis can include detecting, identifying, and tracking objects of interest in the video.

The doorbell camera 102 can generate a four-channel image from an input three-channel image. The doorbell camera 102 receives input video 110 that can include multiple image frames. In some examples, the doorbell camera 102 can receive the multiple image frames in real time as the doorbell camera 102 captures the images. The doorbell camera 102 can obtain two frames from the video.

In some examples, the doorbell camera 102 can obtain 112 a current frame and can obtain 116 a previous frame from the input video 110. The current frame and the previous frame may be RGB three-channel images. In some examples, the doorbell camera 102 can obtain a current frame and a subsequent frame from the input video 110. The subsequent frame can be, for example, the next sequential frame of the video following the current frame. In some examples, the subsequent frame may be a frame that is two frames later than the current frame. In some examples, the subsequent frame may be three frames later, four frames later, five frames later, etc.

The doorbell camera 102 can compute 118 a frame difference image 122 between the current frame and the previous frame. The doorbell camera 102 can convert the frame difference image 122 to a single-channel grayscale image.

The doorbell camera 102 can add the frame difference image 122 to a three-channel image 120 corresponding to the current frame in order to generate a four-channel image 130. The doorbell camera 102 can output the four-channel image 130 and the frame difference image 122 to an object detector, e.g., a human detector. In some examples, the human detector may be incorporated into the doorbell camera 102. In some examples, the human detector may be located remotely from the doorbell camera 102 and may receive the four-channel image 130 and the frame difference image 122 from the doorbell camera 102 over a network.

The human detector locates depictions of humans in the four-channel image 130. If the human detector locates a depiction of a human, the human detector outputs an indication that the human detector detected a human in the four-channel image 130. In some examples, the indication that the human detector detected a human in the four-channel image 130 can be a bounding box around the human detected in the image. The bounding box indicates bounds of a location of the detected human within the image. The bounding box can approximate the outline of the detected human.

A human detector may generate false alarms due to movement of objects such as shrubs, human shadows, flags, etc. The human detector can use motion difference image information to reduce the false alarms. For example, based on motion difference information, the human detector can exclude object motion that has less than a threshold of motion energy. Specifically, the human detector can evaluate the frame difference image 122 component of the four-channel image 130 to differentiate motion energy corresponding to human movement from motion energy corresponding to object movement. Additionally, the human detector can evaluate the frame difference image 122 component of the four-channel image 130 to differentiate motion energy corresponding to human movement from motion energy corresponding to stationary objects. This can reduce false alarms that may be caused by stationary objects.

Figure 1B:
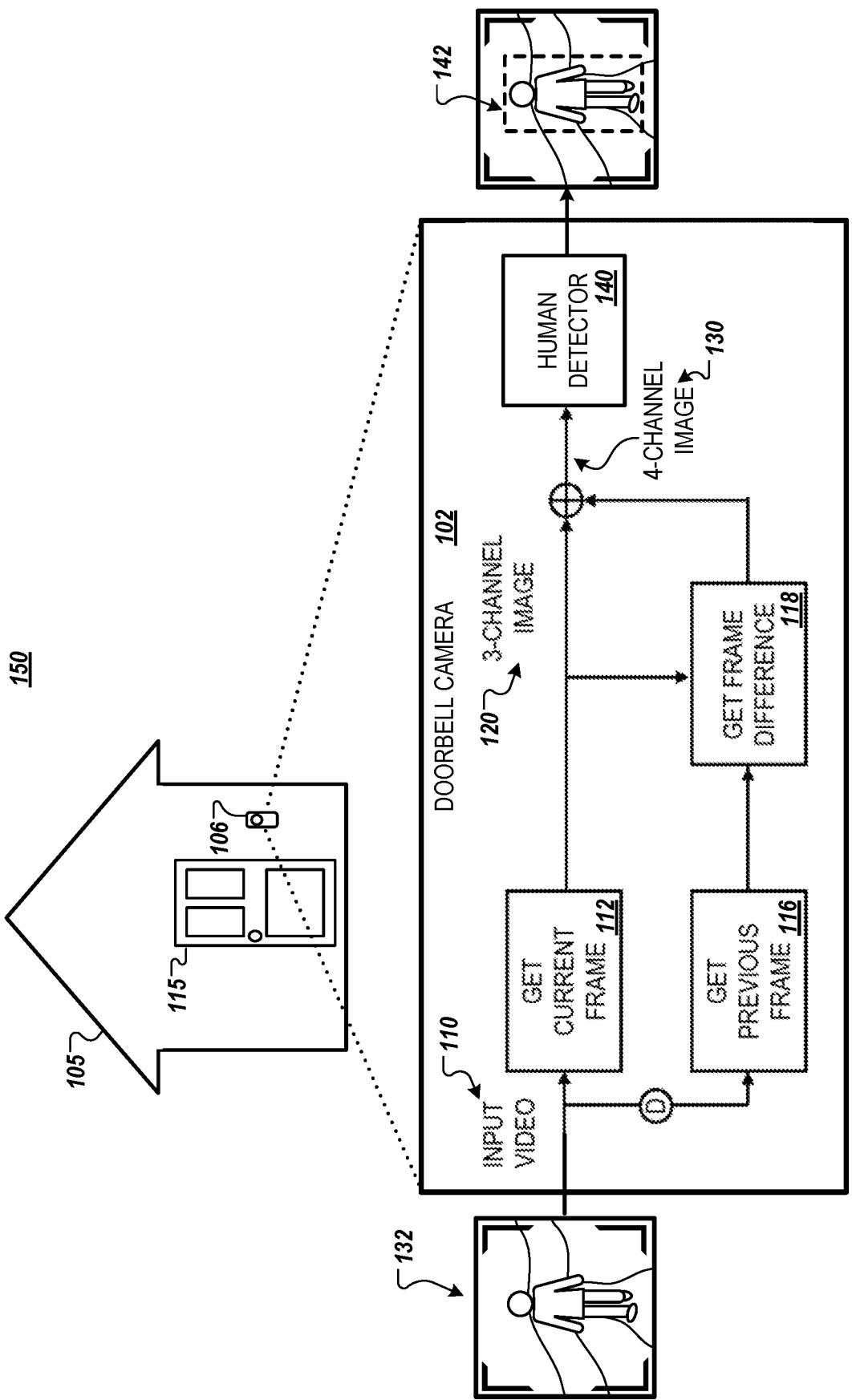
FIG. 1B illustrates an example system for motion-based human video detection using a doorbell camera.

FIG. 1B illustrates an example system 150 for motion-based human video detection using a doorbell camera. The system 150 includes similar components to the system 100, e.g., the doorbell camera 102 installed at the property 105.

The doorbell camera 102 can generate a four-channel image from an input three-channel image. The doorbell camera 102 receives input video 110 that can include multiple image frames, e.g., current frame 132. The doorbell camera 102 can obtain 112 a current frame 132 and can obtain 116 a previous frame from the input video 110. The current frame 132 and the previous frame may be RGB three-channel images. The doorbell camera 102 can compute 118 a frame difference image 122 between the current frame 132 and the previous frame. The pixel value of each pixel in the frame difference image 122 is the difference in pixel value between the current frame and the previous frame. The pixel value of each pixel can be calculated, e.g., by subtracting the pixel value of the previous frame from the current frame, or subtracting the pixel value of the current frame from the previous frame. For example, a pixel value of a pixel in the current frame may be RGB=(204,211,231), a light blue color. The corresponding pixel in the previous frame may be RGB=(138,100,210), a light purple color. The corresponding pixel in the frame difference image thus has a pixel value of RGB=(66,111,21), a shade of green.

In some examples, the frame difference image 122 can be computed using absolute values of pixel differences. For example, a pixel in the current frame may have a pixel value of RGB=(58,20,132), a shade of purple. The corresponding pixel in the previous may have a pixel value of RGB=(209, 43,165), bright pink. Because the pixel scale ranges from 0 to 255, subtracting the previous pixel value from the current value would result in RGB=(0,0,0), or black. This would indicate no change between the current frame and the previous frame. However, by using the absolute value of pixel differences, the doorbell camera can determine a pixel value in the frame difference image of RGB=(151,23,33), a shade of red. Thus, the doorbell camera 102 can determine an absolute value difference between pixel values in computing the frame difference image.

The doorbell camera 102 can convert the frame difference image 122 to a single-channel grayscale image. For example, the doorbell camera 102 can determine relative luminance for each pixel. Relative luminance can be determined by determining a weighted average of RGB values of a pixel. An example equation for calculating relative luminance for a pixel is shown in Equation 1.

$$Y=0.2126R+0.7152G+0.0722B \qquad \text{Equation 1}$$

In this way, relative luminance of a pixel can be represented by a single value between 0 and 255, with zero representing black and 255 representing white. For the example pixel with RGB=(66,111,21), the relative luminance is 94.5. To convert the frame difference image 122 to the single-channel grayscale image, the doorbell camera can determine the relative luminance for each pixel of the frame difference image and assign the relative luminance value to each pixel.

In some examples, the doorbell camera 102 can determine a luma of each pixel instead of, or in addition to, the relative luminance. The luma of each pixel is a weighted average of gamma compressed RGB values of the pixel. The doorbell camera can generate the single-channel grayscale image using the luma values for each pixel.

In some examples, the doorbell camera 102 can convert the first image to grayscale, convert the second image to grayscale, and compute the frame difference image 122 by comparing the first grayscale image to the second grayscale image. For example, the doorbell camera 102 can convert the first image to grayscale using luma values for each pixel in the first image, and can convert the second image to grayscale using luma values for each pixel in the second image. The doorbell camera 102 then can compare the two grayscale images by subtracting the luma values for each pixel. The resulting pixel values compose the frame difference image 122.

The doorbell camera 102 can add the frame difference image 122 to a three-channel image 120 corresponding to the current frame in order to generate a four-channel image 130. The doorbell camera 102 can output the four-channel image 130 to a human detector 140. In the example system 150, the human detector 140 is incorporated into the doorbell camera 102. Based on the four-channel image 130, the human detector 140 can detect a human in the image and can generate a bounding box 142 around the human. In this way, the doorbell camera 102 can perform object inference using the trained human detector 140.

FIG. 2 illustrates example image frames that can be used for detecting and tracking human motion. Specifically, FIG. 2 shows an example previous frame 210, current frame 220, and frame difference image 230.

The previous frame 210 and the current frame 220 can be, for example, sequential frames of the input video 110 to the doorbell camera 102. The previous frame 210 includes an RGB image of a man standing in front of a background. The current frame 220 includes an RGB image of the same man standing in front of the same background as the previous frame 210. The man standing in current frame 220 is located closer to the doorbell camera 102 than in the previous frame 210. Additionally, the man standing in current frame 220 is located further to the left of the current frame 220 than in the previous frame 210. Therefore, in comparison to the previous frame 210, the man standing in the current frame 220 appears larger, is positioned further towards the bottom of the current frame 220, and is positioned closer to the left side of the current frame 220.

The frame difference image 230 shows a difference between the current frame 220 and the previous frame 210. The frame difference image 230 is a single-channel grayscale image. In general, pixels having a greater difference in pixel values have a larger pixel value in the single-channel grayscale image and will generally appear lighter in the frame difference image. Pixels having a lesser difference in pixel values have a smaller pixel value in the single-channel grayscale image and will generally appear darker in the frame difference image.

Thus, portions of the image that remain the same between the current frame 220 and the previous frame 210 appear black. Portions of the image that remain similar between the current frame 220 and the previous frame 210 appear dark gray. Portions of the image that change between the current frame 220 and the previous frame 210 appear lighter. For example, the background of frame difference image 230 appears darker, while portions of the image that correspond to areas of movement of the man appear lighter.

As described in reference to FIG. 1A, the doorbell camera 102 appends the frame difference image 230 to the current frame 220 as a fourth channel. Appending the frame difference image 230 to the current frame 220 fuses human motion information with the input image. The doorbell camera 102 can output the resulting four-channel image to a human detector.

Figure 3A:
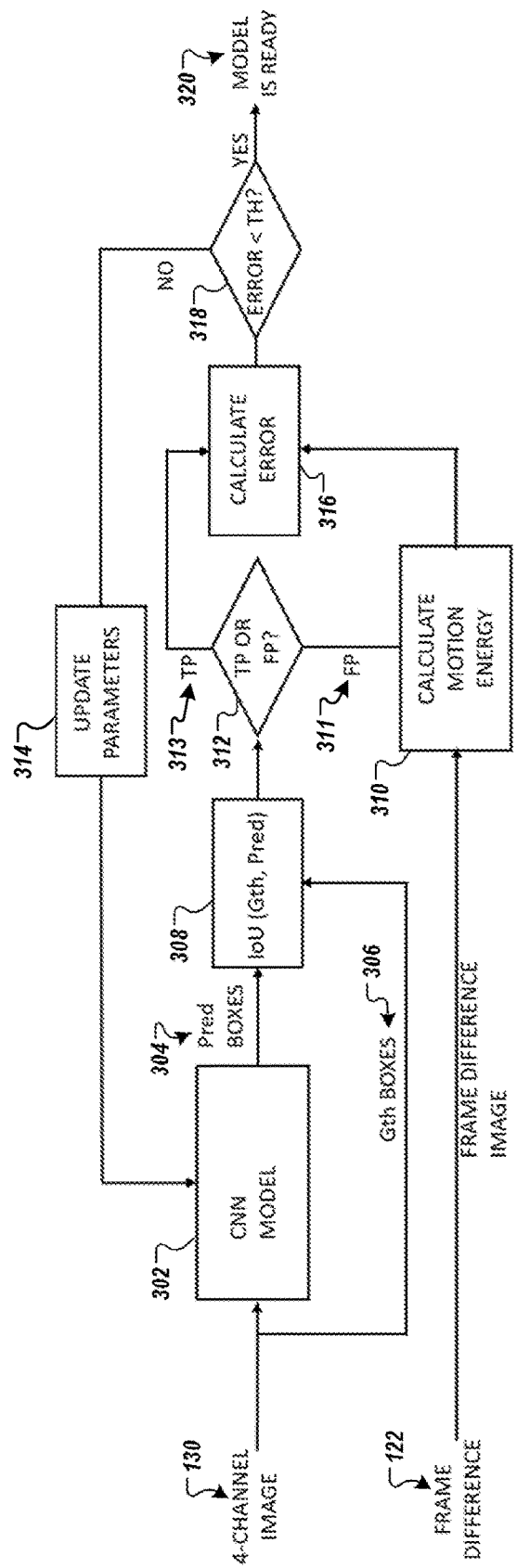
FIGS. 3A and 3B are flow charts illustrating an example of a training process for motion-based human video detection.

FIG. 3A is a flow chart illustrating an example of a training process 300 for motion-based human video detection.

A human detection model can be trained using transfer learning. For example, to train a human detection model, a pre-trained image classifier is trained on a large dataset of images. The pre-trained image classifiers are typically based on three-channel RGB input images.

To improve human detector training, after pre-training, an image classifier can be fine-tuned using a dataset of four-channel images. The fine-tuned four-channel image classifier can then be used as a pre-trained model for a four-channel human detector. The human detector can then be trained using four-channel doorbell camera images. The presence of the fourth channel information improves both the image classifier and human detector performance.

Four-channel image criteria can be incorporated into a training process through an adaptive false alarm penalty scheme. To train a deep model, e.g., a convolutional neural network (CNN) model 302, a series of forward pass and backward backpropagation is performed on the training data.

The training process 300 includes comparing predicted (PRED) bounding boxes 304 output by the CNN model 302 to ground truth (Gth) bounding boxes 306. An intersection over union (IoU) 308 is determined to evaluate accuracy of the predicted bounding boxes 304. True positive (TP) 313 detections and false positive (FP) 311 detections are identified 312.

Based on detections that the model generates in a forward pass, positive and negative error is calculated 316 to penalize the model for false positive 311 detections, and to boost true positive 313 detections. The error is compared 318 to a threshold (TH) to determine if parameters are to be updated 314. In an adaptive false alarm penalty scheme, when the model generates a false positive 311 detection bounding box in a forward pass, motion energy corresponding to the falsely detected bounding box is calculated 310. The motion energy can be defined as the average of pixel values of pixels of the detected bounding box on the frame difference image 122. In some examples, the pixels of the detected bounding box include pixels that make up boundaries of the bounding box. In some examples, the pixels of the detected bounding box include only pixels inside the bounds of the bounding box.

Since it is desirable to differentiate humans with higher motion energy from objects with lower motion energy, a higher penalty is assigned to the false positive 311 detections with lower motion energy. For example, stationary objects such as sign posts, mailboxes, and statues may be identified as humans by the human detector. In other examples, moving objects such as animals may be identified as humans by the human detector. The penalties assigned for false alarms caused by stationary objects are larger than the penalties assigned for false alarms caused by moving objects. Therefore, penalties assigned are inversely proportional to the motion energy of the false alarm bounding boxes. The penalties are used as the backpropagation error to update 314 model parameters. This approach can reduce false alarms caused by stationary objects with human-like silhouettes.

Through the training process 300, the four-channel images can be used to train a deep learning human detection model. The training process results in a trained human detection model 320 for which the calculated errors are reduced below the threshold. The human detection model can not only learn to identify features corresponding to the human body, but can also learn to correlate the presence of a human in a frame to the presence of motion information in the fourth channel of the image.

Figure 3B:
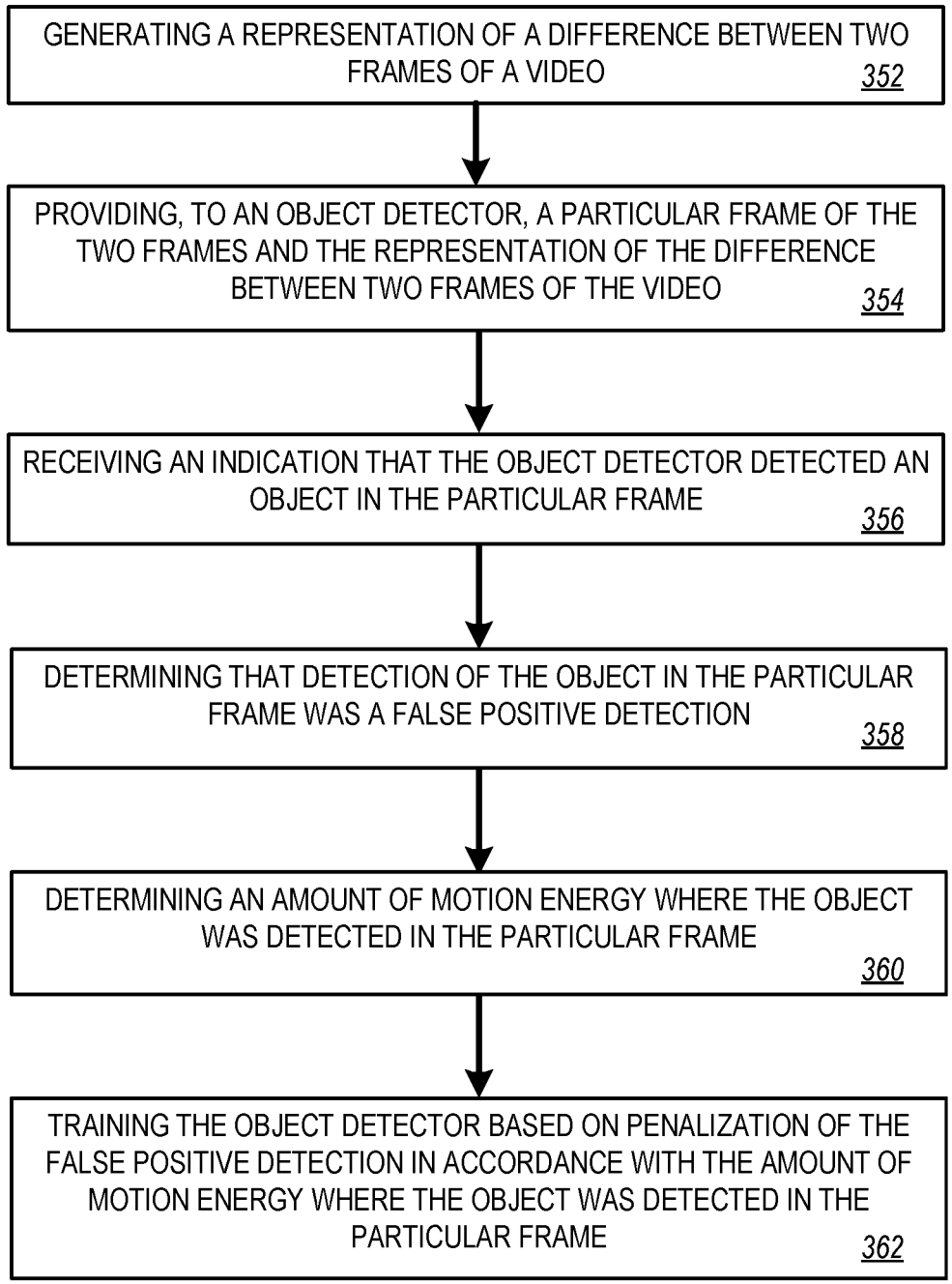

FIG. 3B is a flow chart illustrating an example of a training process 350 for motion-based human video detection. The training process 350 can be performed by a computing system including a camera. The training process 350 can be performed, e.g., by the doorbell camera 102. In some examples, the training process 350 can be performed by a component of a monitoring system for monitoring a property. For example, the process 350 can be performed by a control unit or a monitoring server of a monitoring system for monitoring the property 105.

The process 350 includes generating a representation of a difference between two frames of a video (352). The two frames include sequential image frames of the video. The video can be captured by a camera, e.g., the doorbell camera 102. In some examples, the two frames can include a current frame and a previous frame of the video. In some examples, the two frames can include a current frame and a subsequent frame of the video.

The representation of the difference between the two frames of the video can include a single-channel grayscale image. In some examples, the system can compare pixel values of the two frames to produce a color difference image. The system can then convert the color difference image to a grayscale image, e.g., frame difference image 122. In some examples, the system can convert the color difference image to grayscale image based on luma values or luminance values of the pixels of the difference image.

The process 350 includes providing, to an object detector, a particular frame of the two frames and the representation of the difference between two frames of the video (354). The particular frame can include pixel values, e.g., RGB values, of each pixel in the particular frame. In some examples, the object detector is a human detector, e.g., the human detector 140. For example, the object detector may be capable of both object detection and of classification of human shapes. The human detector 140 can detect the presence of an object in the particular frame, and can classify certain objects as humans.

In some examples, the two frames can include the particular frame and a second frame immediately preceding the particular frame in the video. In some examples, the two frames can include the particular frame and a second frame immediately following the particular frame in the video.

In some examples, providing, to an object detector, a particular frame of the two frames and the representation of the difference between two frames of the video includes generating a four-channel image. The four-channel image can include a three-channel RGB image and a single-channel image representing the difference between the two frames of the video. The system can generate the four-channel image by combining the representation of the difference and the particular frame. For example, the particular frame can include three channels, e.g., red, green, and blue channels for each pixel. The representation of the difference can include a single-channel. For example, the representation of the difference can include a frame difference image with grayscale pixel values. The grayscale pixel values can represent the luma of the pixel difference between pixels of the particular frame and pixels of the second frame. The system can combine the particular frame with the frame difference image in order to generate the four-channel image. The system can provide the four-channel image to the object detector.

The process 350 includes receiving an indication that the object detector detected an object in the particular frame (356). In some examples, the indication that the object detector detected the object includes a bounding box, e.g., bounding box 142, that indicates bounds of a location of the detected object. For example, the system can generate a bounding box that outlines a shape of the detected human. In some examples, the bounding box may be a rectangular, square, or elliptical bounding box. In some examples, the bounding box can approximate the outline of the detected human.

The process 350 includes determining that detection of the object in the particular frame was a false positive detection (358). In some examples, determining that detection of the object was a false positive detection includes determining, based on ground truth specified by training data, that the detection of the object was a false positive detection.

In some examples, determining that detection of the object was a false positive detection includes determining, based on ground truth specified by training data, that the detected object was not a human. For example, training data may include sets of images including the two frames. The training data may also include, for each image, ground truth specifying whether or not an object is present in the image. The ground truth may also specify whether or not the detected object is a human. The ground truth may also specify a location, size, and shape of the detected object. The doorbell camera 102 may determine, based on the ground truth, that the detected object was not a human, e.g., that the detected object was a tree, pole, vehicle, animal, or other non-human object. Based on determining that the detected object was not a human, the doorbell camera 102 can classify the detection as a false positive detection.

The system can determine that the detection of the object was a false positive detection by comparing the detected bounding box to the ground truth bounding box. The system may determine an amount of overlap between the detected bounding box and the ground truth bounding box. If the overlap of the bounding boxes meets criteria, the system can determine that the detection was a true positive detection. If the overlap of the bounding boxes does not meet criteria, the system can determine that the detection was a false positive detection. The criteria can include a threshold amount of overlap between the detected bounding box and the ground truth bounding box. For example, the criteria can include a threshold of 70% overlap between the detected bounding box and the ground truth bounding box. If the overlap is less than 70%, the doorbell camera 102 can determine that the detection was a false positive detection. If the overlap is greater than 70%, the doorbell camera 102 can determine that the detection was a true positive detection.

The process 350 includes determining an amount of motion energy where the object was detected in the particular frame (360). In some examples, the amount of motion energy where the object was detected is based on an average pixel value of pixels within a region of the single-channel grayscale image where the object was detected. For example, the amount of motion energy can be based on the average pixel value of pixels within the bounding box of the frame difference image 122. Since the frame difference image is a single-channel image, each pixel of the frame difference image 122 has a single pixel value, e.g., a value between 0 and 255. Smaller values indicate a greater amount of change between images and are represented by lighter shading. Larger values indicate a lesser amount of change between images and are represented by darker shading. Thus, the average pixel value within the bounding box indicates the amount of motion energy within the bounding box, with higher average pixel values indicating a greater amount of motion energy.

In some examples, the amount of motion energy where the object was detected includes average motion energy of only pixels of the bounding box. For example, the bounding box may include a boundary of pixels, e.g., a rectangular boundary, and may also include a number of pixels inside the bounding box. In some examples, the amount of motion energy where the object was detected includes average motion energy, e.g., average pixel value, of the pixels of the boundary and the pixels inside the bounding box. In some examples, the amount of motion energy where the object was detected includes average motion energy of only the pixels inside the bounding box, and does not include pixels of the boundary of the bounding box.

The process 350 includes training the object detector based on penalization of the false positive detection in accordance with the amount of motion energy where the object was detected in the particular frame (362). In some examples, training the object detector based on penalization of the false positive detection includes assigning a penalty to a false positive detection with lower motion energy that is higher than a second penalty assigned to a second false positive detection with higher motion energy. For example, the object detector may detect a first false detection of an object at a location of the current frame 220 that corresponds to the location of a stationary sidewalk, with low motion energy. The object detector may detect a second false detection of an object at a location of the current frame 220 that corresponds to the location of bushes waving in the wind, with higher motion energy. The object detector can be trained by assigning a penalty to the first false positive detection, of the sidewalk, that is larger than the penalty assigned to the second false positive detection, of the bushes.

In some examples, training the object detector based on penalization of the false positive detection includes assigning a penalty that is inversely proportional to the amount of motion energy where the object was detected in the particular frame. For example, the average pixel value in the frame difference image in a bounding box around the sidewalk may be 30. The average pixel value in the frame difference image in a bounding box around the bushes may be 75. The penalty assigned to the false positive detection of the sidewalk may therefore be proportional to $1/30$, while the penalty assigned to the false positive detection of the bushes may be proportional to $1/75$.

The process can include generating a representation of a difference between another two frames of a video, and providing, to the trained object detector, a particular frame of the another two frames and the representation of the difference between the another two frames of the video. For example, the doorbell camera 102 can generate a frame difference image that is a representation of a difference between the current frame 132 and a previous frame. The doorbell camera 102 can provide the current frame 132 and the frame difference image to the trained object detector, e.g., human detector 140. The process can include receiving an indication that the object detector detected an object in the particular frame. For example, the human detector 140 can indicate detection of the human in the current frame 132 by generating a bounding box 142 around the human in the image.

Based on the indication that the object detector detected an object in the particular frame, the doorbell camera 102 can perform one or more actions. For example, the doorbell camera 102 can generate a notification or an alert to transmit to a device. The notification may include a notification that a human is approaching the doorbell camera 102. The device can include a user device such as a mobile device associated with a resident of the property 105. In some examples, based on the indication that the object detector detected the object, the doorbell camera 102 can perform other actions such as activating a doorbell chime at the property 105.

Figure 4:
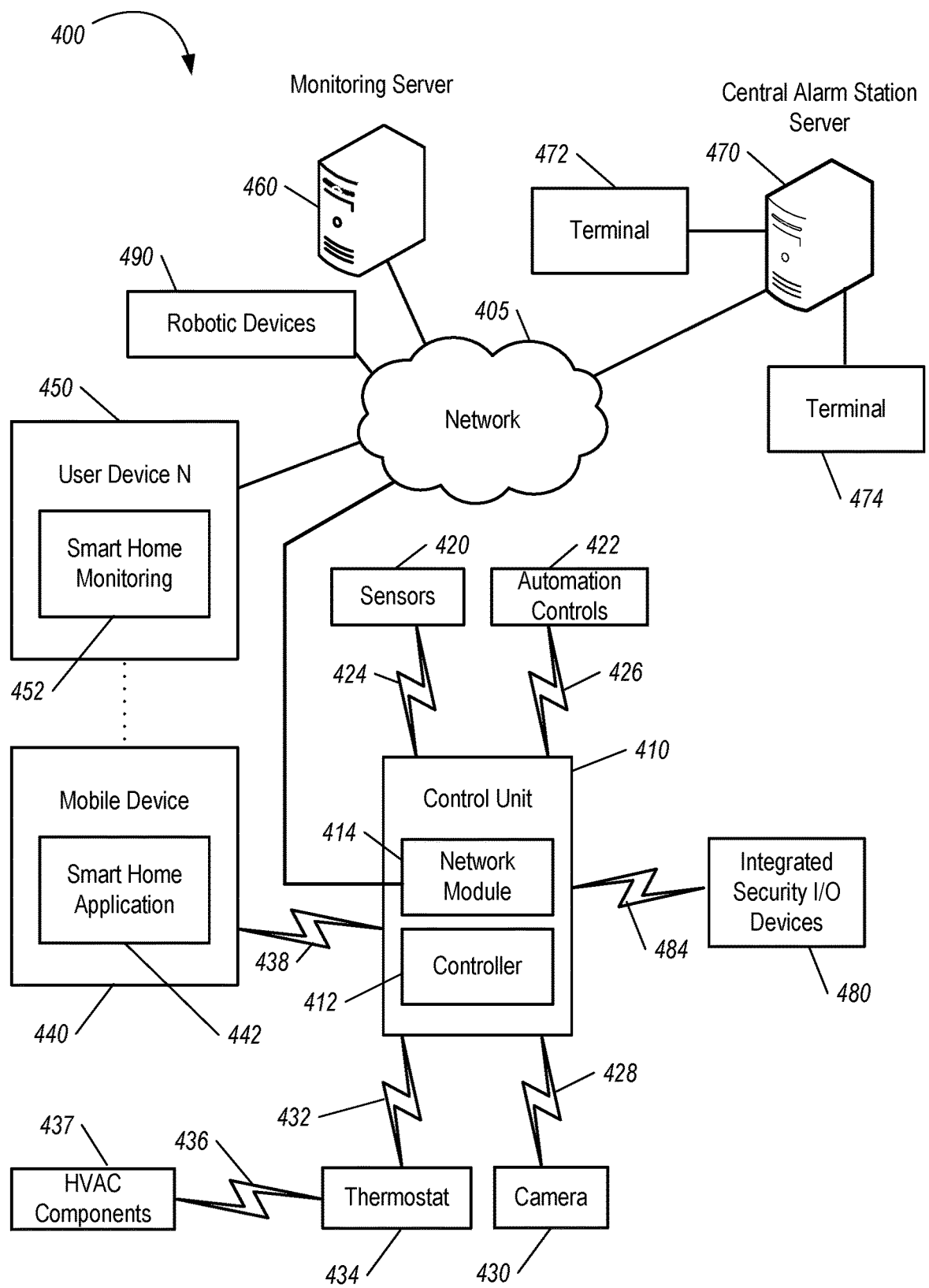
FIG. 4 is a diagram illustrating an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a doorbell camera, lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 108). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
generating a representation of a difference between two frames of a video;
providing, to an object detector, a particular frame of the two frames and the representation of the difference between two frames of the video;
receiving an indication that the object detector detected an object in the particular frame;
determining that detection of the object in the particular frame was a false positive detection;
determining an amount of motion energy where the object was detected in the particular frame; and
training the object detector based on penalization of the false positive detection in accordance with the amount of motion energy where the object was detected in the particular frame.

2. The method of claim 1, wherein providing, to an object detector, a particular frame of the two frames and the representation of the difference between two frames of the video comprises:
generating a four-channel image by combining the representation of the difference and the particular frame; and
providing the four-channel image to the object detector.

3. The method of claim 2, wherein the four-channel image comprises:
a three-channel RGB image; and
a single-channel image representing the difference between the two frames of the video.

4. The method of claim 1, wherein the representation of the difference between the two frames of the video comprises a single-channel grayscale image.

5. The method of claim 4, wherein the amount of motion energy where the object was detected is based on an average pixel value of pixels within a region of the single-channel grayscale image where the object was detected.

6. The method of claim 1, wherein the indication that the object detector detected the object comprises a bounding box that indicates bounds of a location of the detected object.

7. The method of claim 6, wherein the amount of motion energy where the object was detected comprises average motion energy of only pixels of the bounding box.

8. The method of claim 1, wherein determining that detection of the object was a false positive detection comprises determining, based on ground truth specified by training data, that the detection of the object was a false positive detection.

9. The method of claim 1, wherein the object detector comprises a human detector.

10. The method of claim 9, wherein determining that detection of the object was a false positive detection comprises determining, based on ground truth specified by training data, that the detected object was not a human.

11. The method of claim 1, wherein training the object detector based on penalization of the false positive detection comprises assigning a penalty to a false positive detection with lower motion energy that is higher than a second penalty assigned to a second false positive detection with higher motion energy.

12. The method of claim 1, wherein training the object detector based on penalization of the false positive detection comprises assigning a penalty that is inversely proportional to the amount of motion energy where the object was detected in the particular frame.

13. The method of claim 1, wherein the two frames comprise sequential image frames of the video.

14. The method of claim 1, wherein the two frames comprise:
the particular frame; and
a second frame immediately preceding the particular frame in the video.

15. The method of claim 1, wherein the two frames comprise:
the particular frame; and
a second frame immediately following the particular frame in the video.

16. The method of claim 1, comprising:
generating a representation of a difference between another two frames of a video;
providing, to the trained object detector, a particular frame of the another two frames and the representation of the difference between the another two frames of the video;
receiving an indication that the object detector detected an object in the particular frame; and
based on the indication that the object detector detected an object in the particular frame, performing one or more actions.

17. A system comprising one or more processors and one or more computer storage media storing instructions that are operable, when executed by the one or more processors, to cause the one or more processors to perform operations comprising:
generating a representation of a difference between two frames of a video;
providing, to an object detector, a particular frame of the two frames and the representation of the difference between two frames of the video;
receiving an indication that the object detector detected an object in the particular frame;
determining that detection of the object in the particular frame was a false positive detection;
determining an amount of motion energy where the object was detected in the particular frame; and
training the object detector based on penalization of the false positive detection in accordance with the amount of motion energy where the object was detected in the particular frame.

18. The system of claim 17, wherein providing, to an object detector, a particular frame of the two frames and the representation of the difference between two frames of the video comprises:
generating a four-channel image by combining the representation of the difference and the particular frame; and
providing the four-channel image to the object detector.

19. The system of claim 18, wherein the four-channel image comprises:
- a three-channel RGB image; and
- a single-channel image representing the difference between the two frames of the video.

20. A non-transitory computer storage medium storing software comprising instructions executable by one or more computers which, upon such execution, cause the one or more computers to perform operations comprising:
- generating a representation of a difference between two frames of a video;
- providing, to an object detector, a particular frame of the two frames and the representation of the difference between two frames of the video;
- receiving an indication that the object detector detected an object in the particular frame;
- determining that detection of the object in the particular frame was a false positive detection;
- determining an amount of motion energy where the object was detected in the particular frame; and
- training the object detector based on penalization of the false positive detection in accordance with the amount of motion energy where the object was detected in the particular frame.

\* \* \* \* \*